United States Patent Office 3,069,331
Patented Dec. 18, 1962

3,069,331
SEPARATION OF N-METHYL PIPERAZINE FROM MIXTURES THEREOF WITH PIPERAZINE
Richard C. Myerly, South Charleston, and Joseph P. Creagh, St. Albans, W. Va., assignors to Union Carbide Corporation, a corporation of New York
No Drawing. Filed Aug. 10, 1959, Ser. No. 832,445
3 Claims. (Cl. 202—39.5)

This invention relates to N-methylpiperazine and more particularly to a method for the separation of N-methylpiperazine from mixtures thereof with piperazine.

The chemistry of piperazine has become important and significant in the chemical industry due to the rapid growth of derivatives thereof which find utility as resin-curing agents, antihistamines, drugs, and in the synthesis of dyes. In the field of pharmacology, for example, the piperazine derivative, N-methylpiperazine, provides a valuable route in synthesizing the N'-methylpiperazino-propyl derivative of phenothiazine, a tranquillizing drug which possesses good euphoric properties in the treatment of certain mental disorders. Other important biologically active derivatives include N-methyl N'-diphenylmethyl-piperazine and 1 - diethylcarbamyl-4-methylpiperazine which are used, respectively, as an antihistaminic and filaricide.

Known procedures for preparing N-methylpiperazine which have been described in the literature include the methods of Baltzly et al. (J. Am. Chem. Soc. 66 (1944), 263–66); Prelog and Stepan (Coll. Trav. Chim. Tchecosl. 7 (1935), 93–102); and Morren, U.S. Patent 2,639,284. Although N-methylpiperazine produced by these processes is obtained in good yields, its use in the preparation of medicinals intended for human or animal consumption has been handicapped to some extent due to the fact that stringent specifications require a high purity product free from contaminating impurities which might otherwise introduce unknown or harmful physiological effects into a pharmaceutical composition of known properties. For example, in synthesizing N-methylpiperazine by known procedures, the reaction mixture contains chiefly N-methylpiperazine together with varying amounts of piperazine and N,N'-dimethylpiperazine by-products. The N,N'-dimethylpiperazine is readily separated from the reaction mixture by azeotropic distillation, however, this technique or fractional distillation is ineffective in removing contaminating amounts of piperazine to the extent required for obtaining a high quality N-methylpiperazine product.

The present invention is predicated on the discovery that mixtures of N-methylpiperazine and piperazine can be effectively separated by subjecting the mixture to extractive distillation. It has been found that when N-methylpiperazine-piperazine mixtures, such as those obtained by conventional procedures using piperazine as the precursor material, are vaporized in a distillation column and the ascending vapors are brought into contact with ethylene glycol which flows downward and countercurrent to the ascending vapors, the ethylene glycol separates substantially all of the piperazine from the N-methylpiperazine while descending downward through the column and provides an overhead refined product of N-methylpiperazine having a purity of better than 99 percent.

The method of the invention can be accomplished in a continuous, semi-continuous or batchwise fashion, and for most economical and efficient operation, it is preferable to subject the crude mixture containing N-methylpiperazine and piperazine to a preliminary distillation step whereby any N,N'-dimethylpiperazine, solvent, water, etc., are removed. Thereafter, the crude reaction mixture is continuously subjected to extractive distillation to resolve the mixture.

The relative proportions of ethylene glycol solvent used in relation to the amount of N-methylpiperazine-piperazine mixture may vary widely, as will be appreciated, and is not critical to operability. Optimum proportions and concentrations can be readily determined by trial and error and such determinations are within the skill of chemists. As guides in determining optimum values, the amount of ethylene glycol employed should increase as the ratio of piperazine to N-methylpiperazine in the mixture to be resolved increases. Generally the amount of ethylene glycol used can vary from about 1 to 10 times by volume the total volume of N-methylpiperazine-piperazine mixture introduced into the extractive distillation column. The ethylene glycol is preferably used in a ratio of one volume per volume of total volume of the mixture introduced to the distillation column.

As above noted, the mixture of N-methylpiperazine and piperazine is vaporized and the ascending vapors are contacted with ethylene glycol which flows downward through the distillation column and depresses the volatility of the piperazine. Apparently the ethylene glycol also tends to form a loosely bound molecular complex with the piperazine so as to concentrate the impurity in the bottoms material and thereby effect a cleaner separation of the N-methylpiperazine which is removed as an overhead stream. The temperature maintained during the extractive distillation is governed by the boiling point of N-methylpiperazine whereas the temperature in the kettle should be at or slightly above the boiling point of ethylene glycol. For example, under atmospheric pressure the vapor temperature at the head of the column is about 137 to 140° C. with a kettle temperature of about 197 to 200° C.

The extractive distillation is effected in a conventional manner, either at subatmospheric, atmospheric or super-atmospheric pressure, and can be carried out in any suitable apparatus e.g., a distillation kettle equipped with a column having perforated trays, bubble cap trays, or packing materials, etc. equivalent to about 10 to 20 theoretical plates. The distillation column is operated under subatmospheric or atmospheric pressure with a reflux ratio of about 2 to 1.

The mixture of N-methylpiperazine and piperazine to be separated can advantageously be introduced to the side of the extractive distillation column although the optimum point of introduction of the mixture will vary for different concentrations of piperazine and N-methylpiperazine and on the efficiency of the equipment used, the most effective point of introduction usually being somewhere in the lower center half of the column as best determined experimentally in each instance. The ethylene glycol is introduced below the top of the column and flows downward and countercurrent to the rising vapors thereby depressing the volatility of piperazine and sweeping it downward to the bottom of the column, apparently also forming a loosely bound molecular complex with the piperazine as above noted. N-methylpiperazine is removed and condensed as an overhead stream or forefraction. The ethylene glycol and piperazine are removed as a liquid from the bottom of the column and can be separately recovered or purified for reuse by acid neutralization which breaks the complex, followed by distillation to remove the ethylene glycol from the piperazine salts.

The advantages and utility of the invention will become further apparent from the detailed description of the following examples which illustrate the best mode now contemplated for carrying out the invention.

*Example 1*

A 30-tray Oldershaw column, equivalent to about 20 theoretical plates, was used as a continuous extractive distillation. Essentially forty milliliters per 1000 seconds of N-methylpiperazine containing 0.6% by weight of piperazine were introduced to the 10th tray from the bottom. Ethylene glycol was fed to the 20th tray from the bottom at a rate of 65 ml. per 1000 seconds, while 42 ml. per 1000 seconds of product N-methylpiperazine containing no piperazine were removed overhead. The bottoms or tails stream amounted to 63 ml. per 1000 seconds. The still was operated at atmospheric pressure, at an overhead vapor temperature of 134° C. and a base or kettle temperature of 204° C., and at a reflux ratio of 2:1. Analyses for piperazine were made by means of the mass spectrometer.

*Example 2*

The distillation was carried out in a semi-continuous manner, using a 40-plate bubble-cap distillation column (equivalent to 20 theoretical plates) of 36-inch inside diameter, and with a kettle of 2500-gallon capacity and auxiliary equipment. The kettle was charged with 12,546 pounds of N-methylpiperazine containing 6.5% by weight of piperazine from which other impurities had been removed. Still pressure was 100 millimeters and reflux ratio was 2:1. Ethylene glycol was fed throughout the distillation at a rate of 350 pounds per hour to the 20th tray of the column, and the ethylene glycol was fed for two hours before heat was applied to the kettle in order to fill the bottom half of the column with glycol, thus making sure the piperazine was kept down.

Heat was then applied to the kettle and with all flow rates established, a small heads cut was taken. Refined N-methylpiperazine was removed overhead, the head or vapor temperature being 78.5° C. and kettle temperature 106 to 156° C.; the latter temperature of course increased as more ethylene glycol found its way to the kettle and N-methylpiperazine was removed. Recovery of N-methylpiperazine amounted to 8000 pounds, which contained 0.4% by weight piperazine.

*Example 3*

Approximately 5700 pounds of N-methylpiperazine containing 1.5% piperazine were charged to the kettle of the distillation apparatus of Example 2. Ethylene glycol was fed to the 20th tray at a rate of 630 pounds per hour. After the glycol feed was started, heat was applied to the kettle and the distillation was carried out using the same conditions as those in Example 2 except that to the 8th tray from the bottom, a total of 9400 pounds of N-methylpiperazine containing 1.2% piperazine were fed at a rate of 600 pounds per hour, after the heads cut was removed. A total of 11,300 pounds of refined N-methylpiperazine containing 0.15% piperazine were removed overhead.

What is claimed is:

1. A method for separating N-methylpiperazine from mixtures thereof with piperazine which comprises vaporizing said mixture in a distillation column in the presence of downwardly flowing ethylene glycol, removing from the bottom of the column a mixture comprising ethylene glycol and piperazine and recovering N-methylpiperazine as an overhead stream substantially free of piperazine.

2. The method of claim 1 wherein said mixture is vaporized under atmospheric pressure.

3. The method of claim 2 wherein the amount of ethylene glycol used ranges from about 1 to 10 times by volume the total volume of N-methylpiperazine-piperazine mixture.

References Cited in the file of this patent

UNITED STATES PATENTS

| | | |
|---|---|---|
| 2,905,673 | Moss | Sept. 22, 1959 |
| 2,969,365 | Levis | June 24, 1961 |